(12) United States Patent
Cormier

(10) Patent No.: US 6,964,459 B2
(45) Date of Patent: Nov. 15, 2005

(54) TAMPER-PROOF TRUCK ANTI-THEFT DEVICE

(76) Inventor: David C. Cormier, 3274 Andy La., Crestview, FL (US) 32541

( * ) Notice: Subject to any disclaimer, the term of this patent is extended or adjusted under 35 U.S.C. 154(b) by 0 days.

(21) Appl. No.: 10/919,208

(22) Filed: Aug. 16, 2004

(65) Prior Publication Data
US 2005/0017575 A1    Jan. 27, 2005

Related U.S. Application Data

(63) Continuation-in-part of application No. 10/689,957, filed on Oct. 21, 2003.
(60) Provisional application No. 60/464,597, filed on Apr. 22, 2003.

(51) Int. Cl.[7] .............................................. B60R 25/08
(52) U.S. Cl. ............................. 303/89; 70/164; 70/177
(58) Field of Search .......................... 188/265; 303/89; 70/177, 178, 179, 164

(56) References Cited
U.S. PATENT DOCUMENTS 5,375,916 A * 12/1994 Cook ........................... 303/89
5,560,233 A * 10/1996 Watkins ........................ 70/177
5,688,027 A * 11/1997 Johnson ........................ 303/89
5,735,147 A *  4/1998 Cattanach et al. ............ 70/164
6,382,000 B1 *  5/2002 Horton ......................... 70/163
6,606,887 B1 *  8/2003 Zimmer et al. ............... 70/164
6,634,195 B2 * 10/2003 Lenz et al. ................... 70/178
6,789,856 B2 *  9/2004 Bottiglieri .................... 303/89

* cited by examiner

Primary Examiner—Chris Schwartz
(74) Attorney, Agent, or Firm—J. Ronald Richebourg

(57) ABSTRACT

An anti-theft device is disclosed for use on a vehicle employing air-operated parking brakes. The device is shaped for disposal about the parking brake control knobs when engaged. The device includes a pair of mating halves formed for surrounding and enclosing the control knobs while in an engaged position. A first of the halves includes a tongue having an opening therein and a second of the halves includes a channel for receiving the tongue. A lock is provided with a locking pin being disposed in the second half wherein the locking pin engages the opening in the tongue in order to secure the first and second halves together. Also, an adjustment mechanism is provided for tailoring the device to minor differences between the brake control knobs from one vehicle to another.

15 Claims, 7 Drawing Sheets

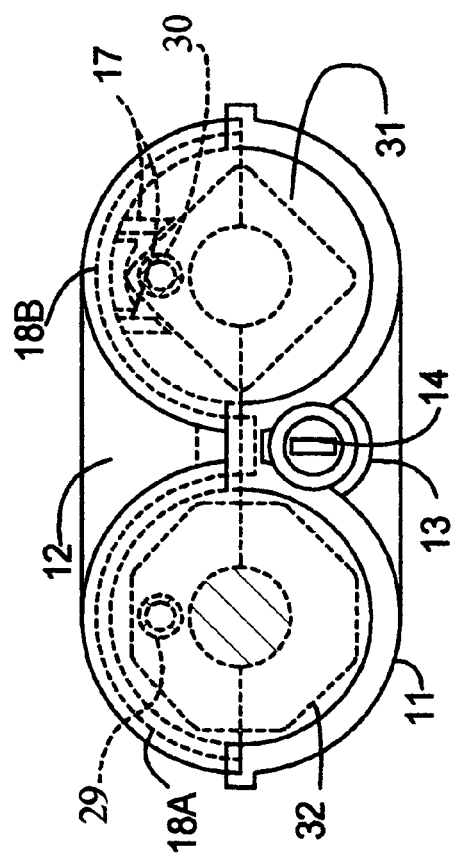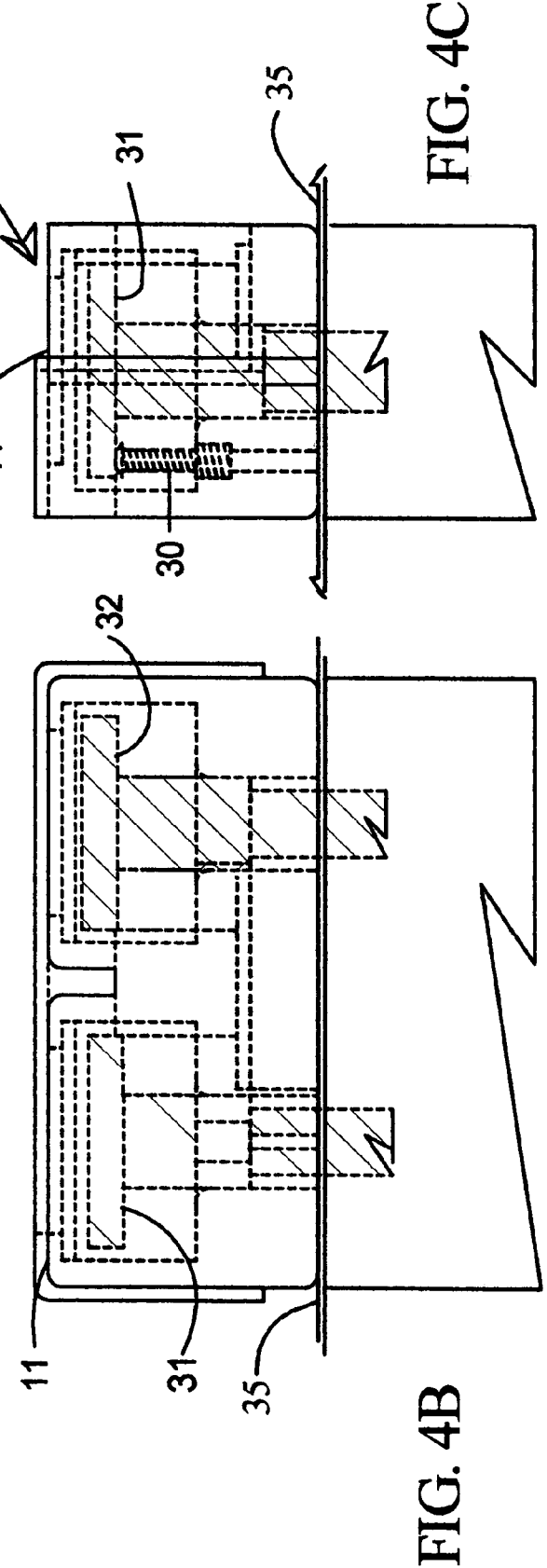

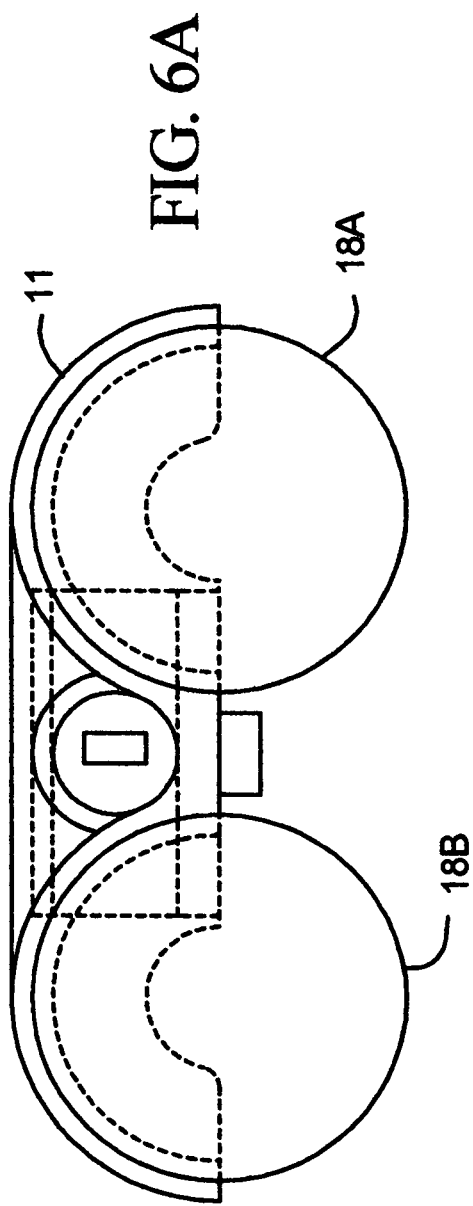
FIG. 6A
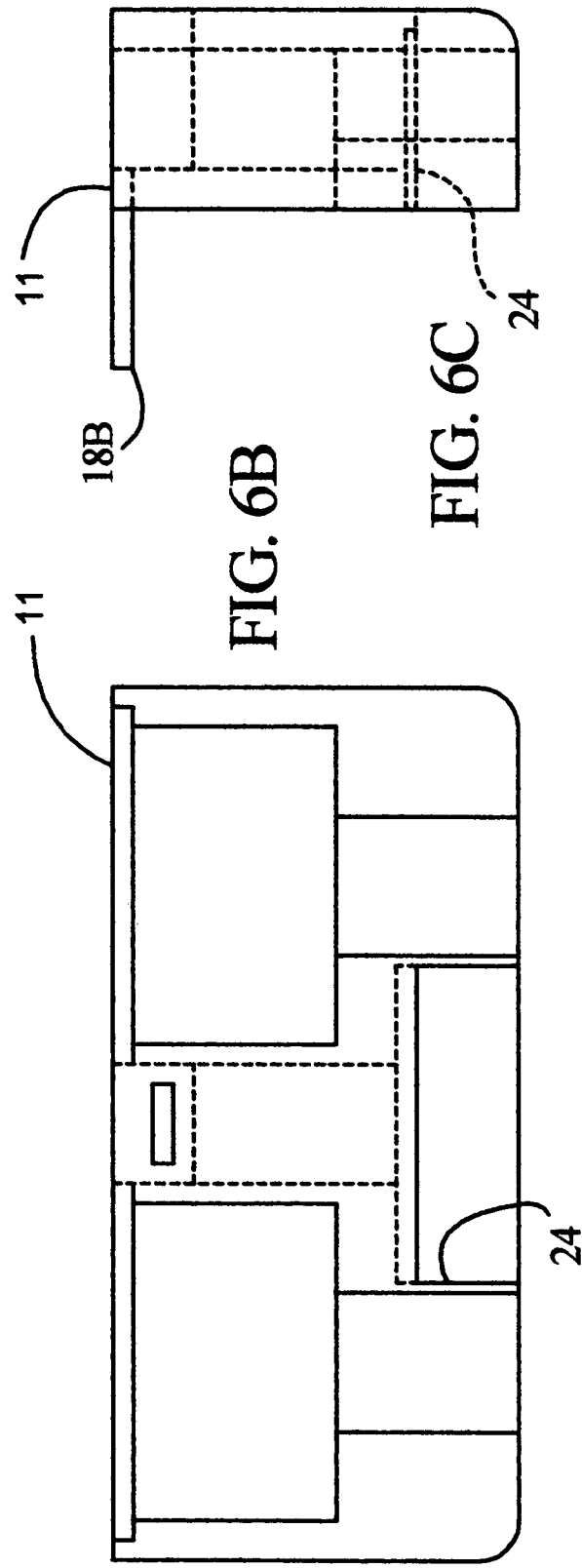
FIG. 6B
FIG. 6C

TAMPER-PROOF TRUCK ANTI-THEFT DEVICE

CROSS REFERENCE TO RELATED APPLICATION

This is a Continuation-in Part Application of application Ser. No. 10/689,957, filed Oct. 21, 2003, which is a Continuation Application of Provisional Application No. 60/464,597 filed Apr. 22, 2003.

FIELD OF THE INVENTION

The present invention generally relates to the field of vehicular anti-theft devices and in particular to an improved tamper-proof anti-theft device adapted for preventing undesired release of air-operated parking brakes on tractor-trailer truck rigs.

BACKGROUND OF THE INVENTION

Theft of cargo carrying vehicles is a serious problem. Many billions of dollars in commercial cargo travel our highways each and every day. The value of the cargo is very enticing to those criminally inclined who profit from theft of such cargo. Notwithstanding numerous efforts to stem the tide of such crimes, the loss of stolen cargo is still a serious problem. The monetary loss of cargo also causes an increase in the price of goods to each and every citizen. Some estimates place the annual loss of cargo by theft in the tens of billions of dollars. More recently, with emphasis on preventing or deterring terrorist activity, it is of paramount importance to prevent theft of tractor trailer rigs carrying sensitive cargo, such as weapons, volatile gases or the like.

Many efforts have been made in the past to stop or curtail cargo thefts, including the addition of guards at truck stops or the adding of guards who ride "shot-gun" on these vehicles. With specific reference to tractor-trailer truck rigs by way of example only and not as a limitation, for which the present invention has specific usefulness, a typical prior art device is commonly referred to as a "king pin lock". This device comprises a large pin which is inserted into the coupling between the tractor and the trailer in order to prevent a hook-up of a cargo-laden trailer to an outlaw tractor. Another prior art device is referred to as a "glad hand lock", which prevents hooking up of the air brake lines between the tractor and an outlaw trailer. There are many other similar types of prior art anti-theft devices available, but none of them prevents theft of the tractor itself. If the tractor cannot be moved, then the trailer cannot be decoupled from the tractor, thereby preventing theft of the cargo.

An exemplary prior art device is disclosed in U.S. Pat. No. 5,688,027, entitled CONTROL VALVE LOCK FOR A VEHICLE AIR BRAKE SYSTEM, which issued Nov. 18, 1997 to James J. Johnson. This patent discloses a lock device that is securable to the valve actuating shaft on the dashboard control valve and includes a base member to which is secured a large actuating lever. A lock cylinder extends through a portion of the lever and base member and aligns internal locking cavities between the connecting shaft of the lever and the base member whereby the locking dog of the lock cylinder can engage in the cavities to secure the lever in a retracted position thereby locking the brakes of the vehicle. In order to unlock the brakes, it is necessary to insert a key in the key cylinder to free the lever in order to permit it to be pushed in, whereby the dashboard control valve can supply air to the parking brake cylinder to release the brakes. A large disadvantage of this prior art device is that it is complicated and requires modification of the air brake control mechanism in order to install it on the vehicle.

Another exemplary prior art device is disclosed in U.S. Pat. No. 5,375,916, entitled TRUCK AIR BRAKE LOCKING DEVICE, which issued Dec. 27, 1994, to Bradley W. Cook. This prior art device is directed to a clamp assembly that locks onto the valve knobs of a tractor-trailer rig rendering control of the air brakes inoperable. This device comprises two half bodies connected by a central locking part and at least two side posts, wherein the bodies are placed on the valve knobs, clamped together and locked by means of a lock assembly. A serious problem exists with this device in that a gap exists between the two bodies, which gap is in line with the brake control knobs. Hence, it would be easy for a theft to defeat the purpose of this device.

Yet another prior art device is disclosed in U.S. Pat. No. 5,560,233, entitled AIR BRAKE VALVE SHACKLE, which issued Oct. 1, 1996, to Gerald Watkins. This patent discloses a locking device for air brake valves on vehicles, which comprises releasable elements for engaging an air brake control valve control knob from being pushed inwardly to release the air brakes. The releasable elements are formed identically to one another and, when secured in place allows a gap to exist between the elements in line with the valve control knobs, which could allow one to tamper with the lock and defeat its purpose.

A major problem with the prior art devices discussed above is that they are easily defeated by an industrious theft. That is, there are weaknesses in the design of these devices that would allow a theft to pry open the device or to insert an instrument inside the device and depress the air brake release knobs. Still other of these prior art devices include a lock that could be easily broken. None of the above-cited patents, taken singly or in combination, is seen to describe the device of the present invention as claimed herein.

SUMMARY OF THE INVENTION

As will be amplified in greater detail hereinbelow, the present invention solves one of the prior art problems by use of a device that prevents release of the air brakes on the tractor control panel of a tractor-trailer rig. The lock installs over and around the air control knobs on the dashboard of the tractor without modifications of the air brake control mechanism. The function of the brake control mechanism is to control the flow of air for setting or releasing of the parking brakes. This mechanism typically includes a pair of knobs disposed on the dashboard of the tractor cab, which are of the "push/pull" type. Typically, pulling the knobs outwardly activates or sets the air brakes by the application of compressed air. Pushing the knobs inwardly releases the parking brakes also by the application of compressed air. One of the knobs controls the brakes on the tractor and the other knob controls the brakes on the trailer. When the control knobs are pulled out to engage the parking brakes, a unique device according to the present invention is provided that locks around and behind the air brake control knobs mounted on the tractor dash board, which prevents someone from pushing them in to release the parking brakes. The only way the air brake control knobs may be freed up for operation is by the use of a key that opens up the device of the present invention.

Accordingly, it is an object of the present invention to provide an improved tamper-proof device and method for preventing the theft of semi tractor-trailer rigs by the use of a simple two-piece locking device that wraps around and behind the air brake release knobs and one that overcomes the disadvantages of the prior art devices.

Another object of the present invention is to provide an improved tamper-proof device that is simple to manufacture and one that is simple to use, but is amply secure to prevent theft of the tractor or trailer of a rig.

Another object of the present invention is to provide an improved tamper-proof anti-locking device that requires no modifications to the existing air-brake control mechanism installed on the tractor of a tractor-trailer rig.

A feature of the present invention includes an adjustable mechanism for tailoring the anti-theft device to dimensional differences between air-brake control knobs from one make of tractor to another make.

Another feature of the present invention is to provide a control knob lock that is securable to the air-brake control knob itself and the accompanying actuating mechanisms without disturbing the integrity of the parking brake system and without tapping into the air supply lines of the system and which can be adapted to difficult dashboard control knobs.

These and other objects and features, which will become apparent as the invention is described in detail below, the present invention is an anti-theft device useful in vehicles with at least one extended mechanical valve, wherein said at least one extended mechanical valve includes a valve knob with a front and a back connected to a valve shaft. The anti-theft device includes a mechanical valve cover including a first cover portion and a second cover portion; and a, cover attached to the first cover portion wherein, when the first cover portion and the second cover portion are placed around the extended mechanical valve, the cover covers at least the front of the valve knob with a solid, undivided surface.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive. The present invention will become apparent when taken in conjunction with the following description and attached drawings, wherein like characters indicate like parts, and which drawings form a part of this application.

BRIEF DESCRIPTION OF THE DRAWINGS

FIG. 4A is a plan view of the anti-theft device of the present invention.

FIG. 4B is a side elevation view of the anti-theft device of the present invention mounted to the dashboard of a truck.

FIG. 4C is an end view of the anti-theft device of the present invention mounted to the dashboard of a truck.

FIG. 6A is a plan view of the other half of the anti-theft device of the present invention.

FIG. 6B is a side elevation view of the other half of the anti-theft device of the present invention.

FIG. 6C is an end view of the other half of the anti-theft device of the present invention.

Figure 1:
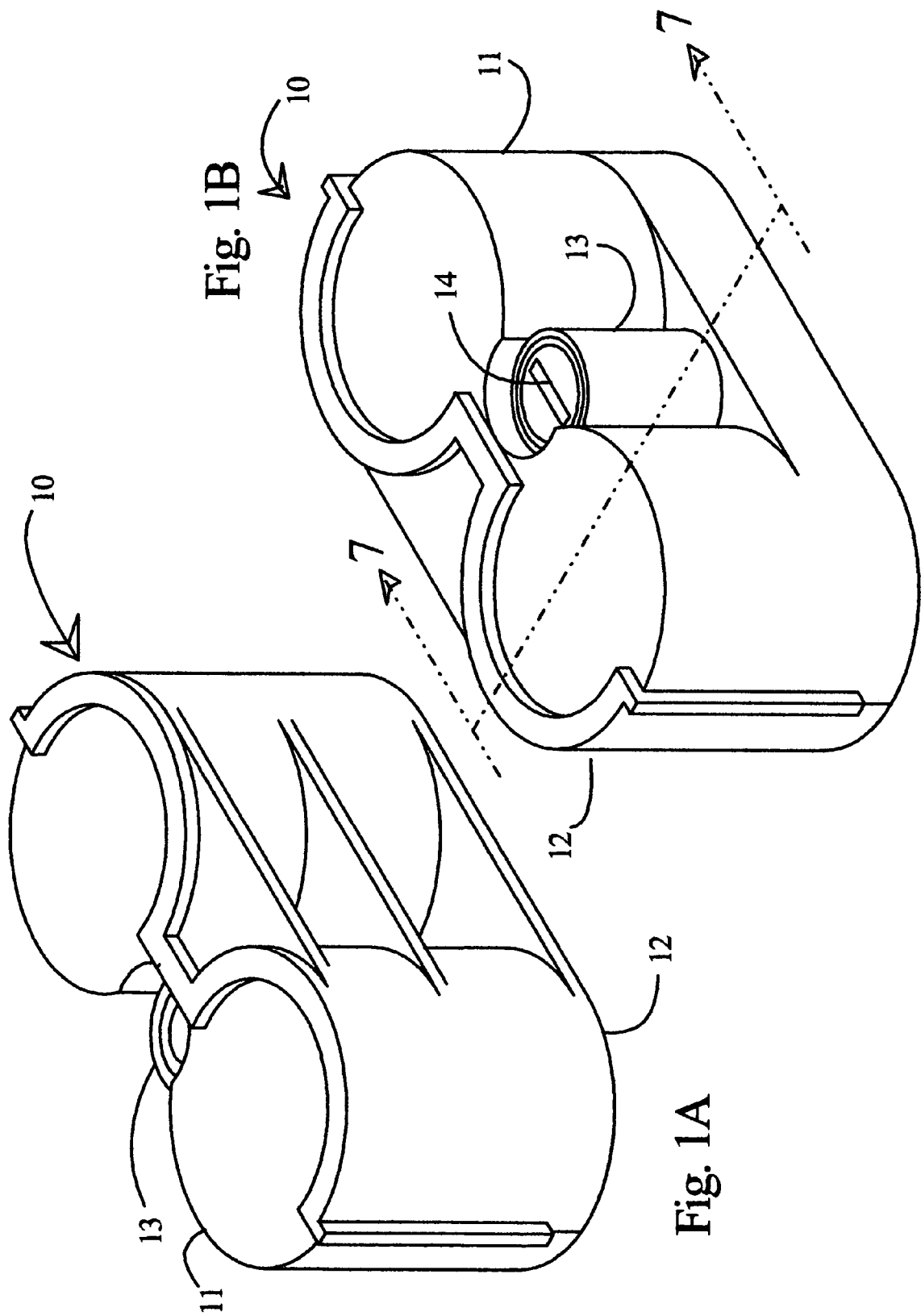
FIG. 1A is a perspective view of one side of the anti-theft device of the present invention.
FIG. 1B is a perspective view of another side of the anti-theft device of the present invention.

DETAILED DESCRIPTION OF ONE EMBODIMENT:

Referring now to the drawings, the anti-theft device 10 of the present invention is shown in various views as will be described in detail hereinbelow. The device 10 is preferably formed of plastic, such as Delrin, or metal (or any other suitable material), into two halves 11 and 12. One embodiment is to manufacture the device from a poly-carbon fiber. A lock 13 having a key slot 14 is provided for locking the two halves 11 and 12 together, as will be amplified hereinbelow. The brake control knobs are not shown in FIGS. 1A and 1B, because they are enclosed by the device 10.

It has been determined that the most effective lock for use with the present invention is an Abloy back loading lock, such as model numbers OF404 or OF605, which are available from Transport Security, Inc. of Waconia, Minn. It is pointed out however, that any other lock now known or hereafter developed is suitable for use as lock 13. The lock may be mounted from the bottom of the device in half 11 during assembly thereof. By bottom mounting of the lock, it is protected and extremely difficult, if not impossible, to defeat. This is particularly true since the locking mechanism 13 engages the anti-theft device 10 at the back of the device, which is shielded from tampering by the dash board of the truck as is described more full hereinafter.

It is preferable to completely enclose the air brake control knobs by the device of the present invention in order to prevent tampering therewith. For example, if there is a way for someone to penetrate the lock with a tool such as a knife, screwdriver or dent puller, then they could defeat the lock and depress inwardly the brake release knobs. In some of the prior art devices, this could be done without removing the lock itself. Accordingly, as will be amplified hereinbelow, the device 10 completely surrounds the brake release knobs and the two mating halves thereof are formed in such a way that one cannot defeat the locking device 10. In particular, applicant's device 10 does not provide access to the face or front of the control knobs when in place, as described more fully hereinafter.

Figure 2:
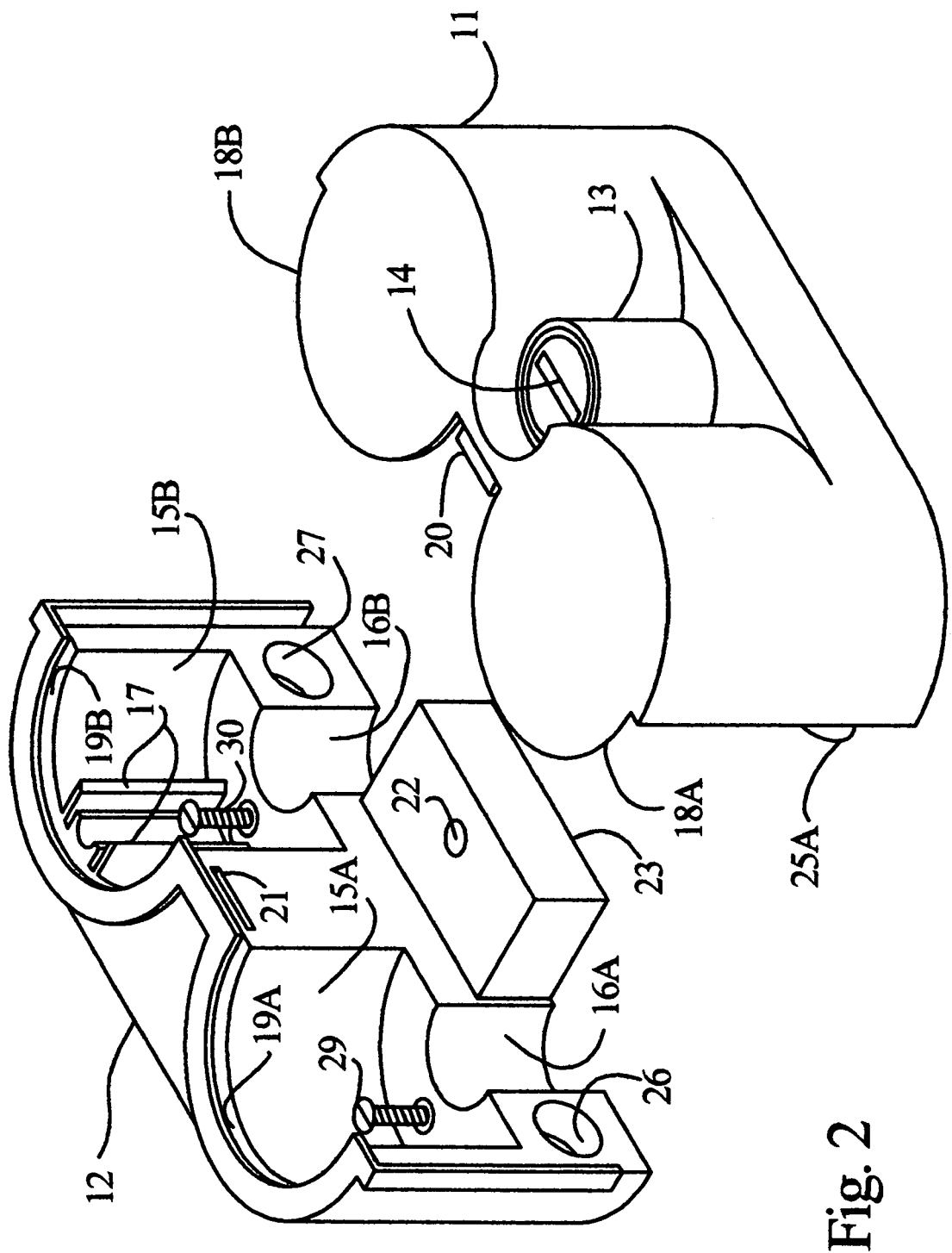
FIG. 2 is an exploded view of the anti-theft device of the present invention illustrating many of the component parts thereof.

With reference to FIG. 2, an exploded view of the device 10 is shown illustrating the various parts of the device and their interrelationship. The brake control knobs (not shown in this drawing) are received by cavities 15A and 15B, and the shafts to which the knobs are attached are received by cavities 16A and 16B, all of which are formed within the halves 11 and 12 of the device 10. Note that, according to one embodiment, vertical ridges 17 are formed within the cavity 15B for engaging a corner of a diamond shaped tractor air-brake control knob, as distinguished from an octagonal shaped control knob for the trailer.

Figure 7:
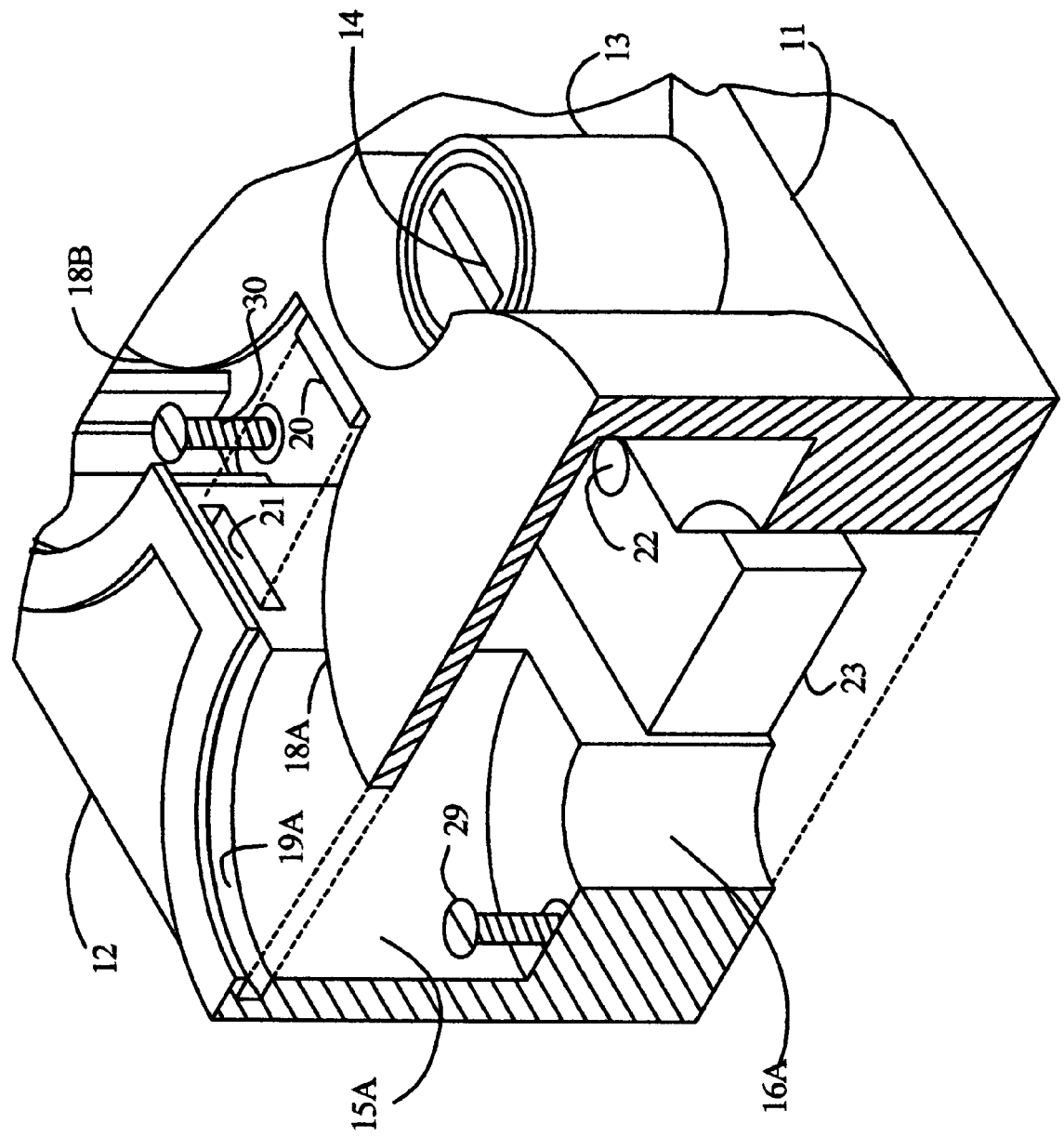
FIG. 7 is a sectional perspective view of the anti-theft device if the present invention taken along section line 7—7 shown in FIG. 1B.

Covers 18A and 18B, which are typically formed as an integral part of half 11, completely cover the cavities 15A and 15B, respectively, for hiding the brake control knobs when the halves are joined together in a locked position, as shown in FIGS. 1A and 1B. Covers 18A and 18B thereby provide a solid, undivided surface covering the brake control knobs. That is, no seam is available for a thief to attempt to defeat the locking device 10 as is the case of the prior art devices. Moreover, an important feature of the present invention is that edges of the covers 18A and 18B engage and are received within mating slots 19A and 19B, respectively, of the half 12. Details of the slot 19A and its alignment with the edge 18A are shown in the sectional perspective view of FIG. 7. Furthermore, a tab 20 is formed near the top and middle of half 11, which tab engages slot 21 of the half 12 when the two halves are joined together. The tab 20 and edges 18A and 18B engaging the mating slots 19A and 19B help to prevent tampering with the device 10 or the lock 13 once it is installed.

In FIG. 2, the lock 13 is illustrated in the open position, since the halves 11 and 12 are separated. When the device halves 11 and 12 are joined together around and over the brake release knobs and the lock is depressed inward, a pin (not shown, but is well known in the art) enters into an opening 22 in a tongue 23 protruding from the half 12 of the device 10. The tongue 23 engages a matching groove 24 formed in half 11 of the device 10 (not shown in this drawing, but see FIG. 3 e.g.). The lock 13 then remains in the inward position (i.e., pin engaged), thereby securing the halves 11 and 12 together, until a key is inserted into the slot 14 and turned to open the lock. The lock 13 will then pop up, which disengages the pin (not shown) from the opening 22. The two halves 11 and 12 may then be separated from one another and then removed from behind and around the air brake control knobs. Any other lock now known or hereafter developed is suitable for the purposes of the present invention.

Guide pins 25A and 25B (not shown in FIG. 2, but see FIG. 3, e.g.) of the half 11, enter into openings 26 and 27, respectively, formed in the half 12 of the device 10. The guide pins may be formed of metal, or any suitable material such as hardened plastic, or they may be formed of the same material as the halves 11 and 12. That is, the guide pins may be formed as a part of the same manufacturing process used to form the halves 11 and 12. The guide pins 24 and 25 prevent rotation of the halves 11 and 12 with respect to one another as well as adding stability to the device 10.

A unique feature of the device of the disclosed invention are a pair of adjustment mechanisms 29 and 30, preferably formed into the half 12. The adjustment mechanisms 29 and 30 allow the user to adjust the device to minor variations in the size of the air brake control knobs, which may vary from one vehicle to another. According to a specific embodiment, the mechanisms 29 and 30 are threaded screws, which engage matching openings tapped into the half 12. With specific reference momentarily to FIG. 4C, note that adjustment mechanism 30 engages the bottom surface of the brake control knob 31, which prevents depression thereof. Hence, even if a thief is able to penetrate the cover 18B he cannot depress the control knob 31 without removing the entire device 10.

It is preferable for the openings 16A and 16B to be substantially the same diameter as that of the shafts of the air brake release knobs, which in one embodiment is approximately ⅞ inch.

Figure 3:
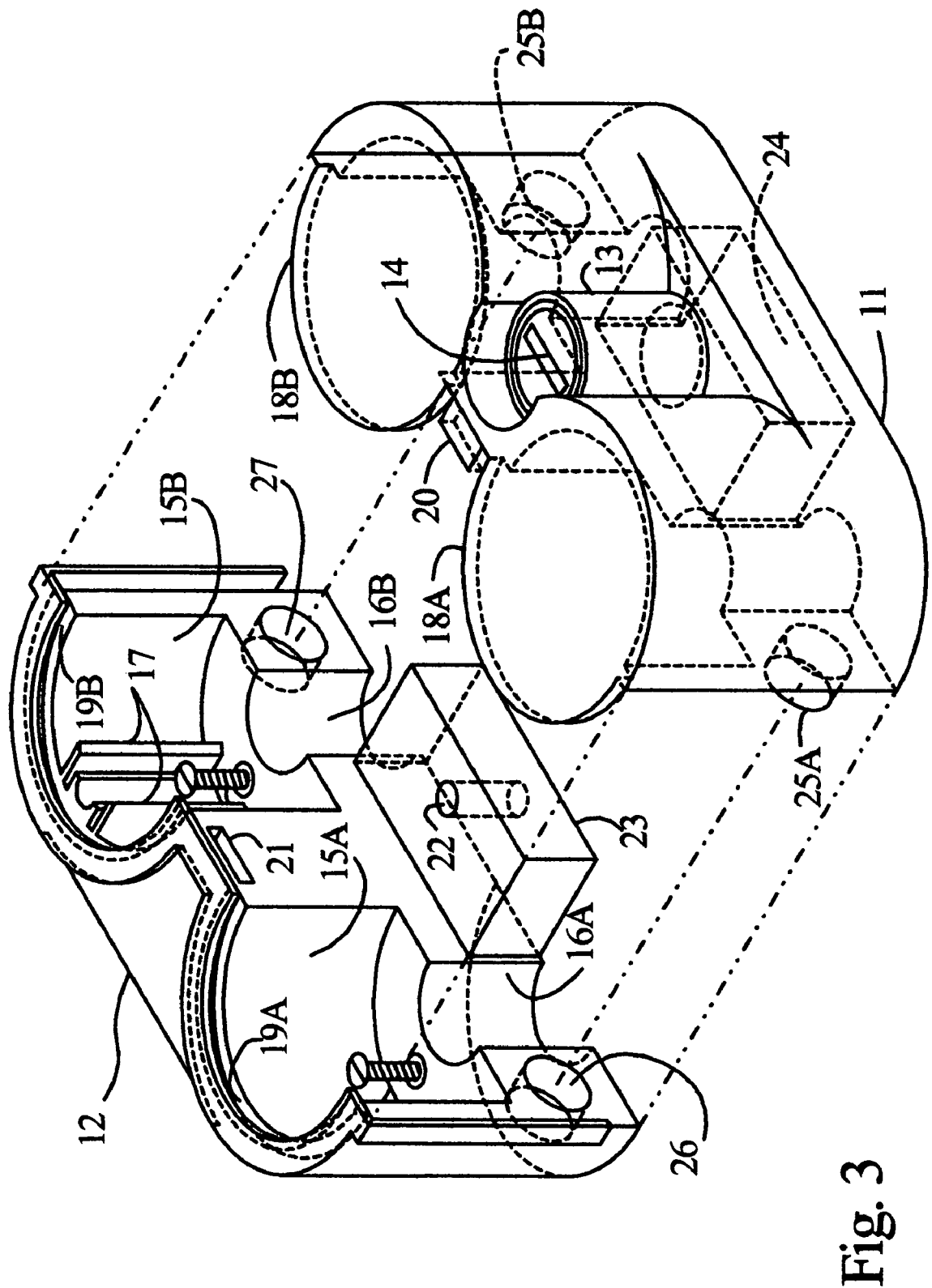
FIG. 3 is an exploded/phantom view of the anti-theft device of the present invention illustrating all of the component parts thereof.

With reference to FIG. 3, a detailed exploded view of the device of the present invention is shown. Again, the device 10 is formed of two halves 11 and 12. FIG. 3 shows (in phantom lines) more details than were shown in FIG. 2. Also, the mating halves of the cavities 15A and 15B, and 16A and 16B, are formed into half 11 for receiving the brake control knobs, and their shafts respectively, as will be amplified hereinbelow.

With reference to FIGS. 4A, 4B and 4C, front, top and end views of the device 10 of the present invention are shown in place on the dash 35 of a vehicle. Note in FIG. 4A that the ridges 17 are in close proximity to a corner of the diamond shaped tractor air-brake control knob 31. Vertical ridges 17 are configured to engage a corner of the diamond shaped brake release knob 31, in order to prevent unscrewing and removal of the control knob from the knob shaft, which would allow release of the brakes by depressing the shaft only. Any type of ridge or projection or mechanism which engages the control knob and prevents its removal is encompassed within the spirit and scope of the present invention.

FIGS. 4B and 4C illustrate the device 10 adjacent to the dashboard 35 of a vehicle, wherein air-brake control knobs 31 and 32 may be seen in phantom lines when enclosed within the device 10. The octagonal brake control knob 32 is for releasing the parking brakes for the trailer. Note in FIG. 4C the adjustment mechanism 30 is set to abut the back side of the tractor brake control knob 31. This prevents any movement of the knob 31 while the device 10 is locked around the control knobs.

Figure 5C:
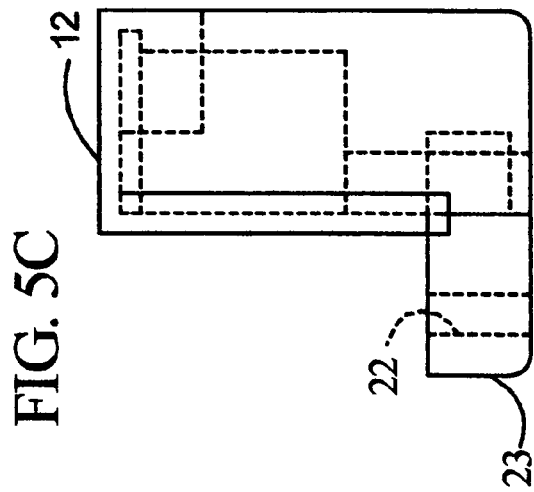
FIG. 5C is an end view of one half of the anti-theft device of the present invention.
Figure 5A:
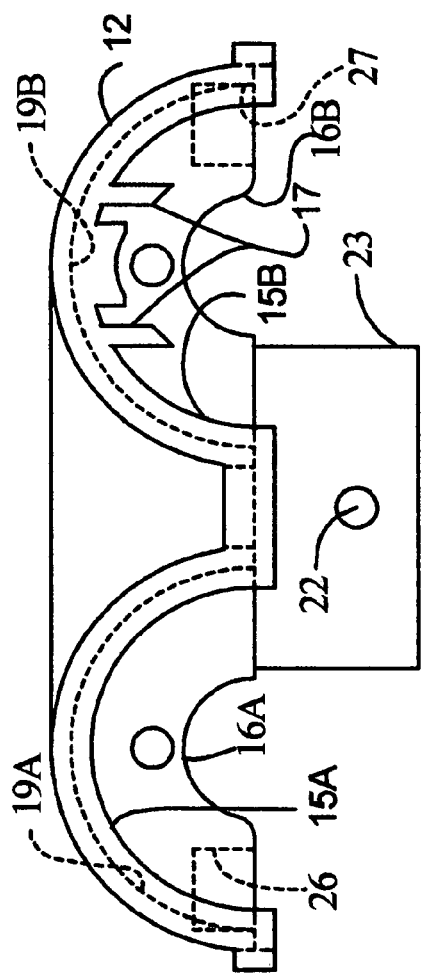
FIG. 5A is a plan view of one half of the anti-theft device of the present invention.
Figure 5B:
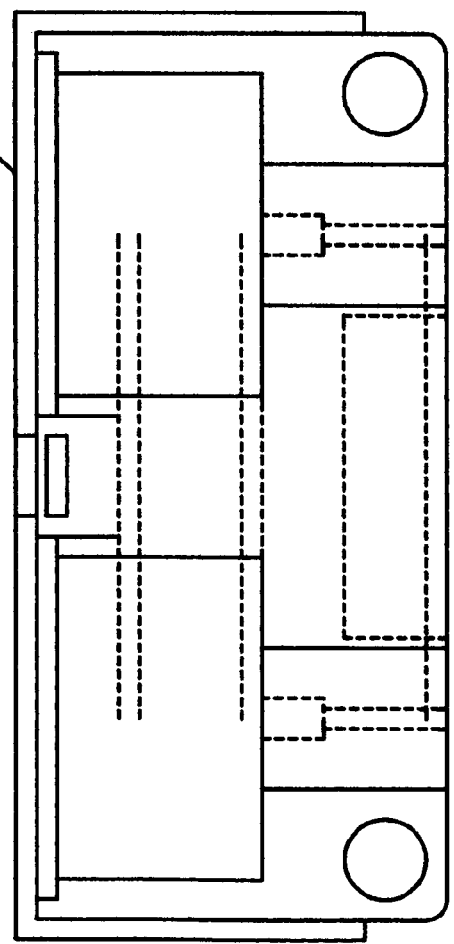
FIG. 5B is a side elevation view of one half of the anti-theft device of the present invention.

FIGS. 5A, 5B and 5C illustrate details of the half 12 of the device 10, while FIGS. 6A, 6B and 6C illustrate details of the half 11 of the same device 10.

To install the Anti-Theft Device of the present invention, the top half (i.e., half 12) is installed over the tractor and trailer air brake control knobs. The screw mechanisms 29 and 30 are used in order to snug the anti-theft device 10 up against the underside of the control knobs 31 and 32, respectively. Once this adjustment has been made it is not necessary to repeat each time the device is installed over the same control knobs. The lower portion of the lock (i.e., half 11) is slid into the top portion of the half 12, wherein tongue 23 engages channel 24 and guide pins 25A and 25B engage openings 26 and 27, respectively. Covers 18A and 18B provide a solid, undivided shield over the control knobs 31 and 32. The push-in lock 13 is then depressed, which engages opening 20 in the tongue 23, thereby connecting the top and bottom halves (11 and 12) to secure the device around the brake control knobs. By completely shielding the control knobs and by means of mechanisms 26 and 27 they cannot be accessed or "pushed" in and the brakes cannot be released. Moreover, it becomes difficult if not impossible to remove the device without use of a key in the lock 13.

Although the invention has been described with reference to a specific embodiment, this description is not meant to be construed in a limiting sense. Various modifications of the disclosed embodiment as well as alternative embodiments of the invention will became apparent to one skilled in the art upon reference to the description of the invention.

I claim:

1. A tamper-proof anti-theft device for a vehicle employing air-operated parking brakes, said device being disposed about said parking brake control knobs when engaged, said device comprising:

a. a pair of mating halves, each having a front and back, an outside surface and an inside surface that mate together, said halves being formed for surrounding and enclosing said brake control knobs while in an engaged position, wherein a first of said mating halves includes a mating slot formed near the front thereof and a tongue near the back thereof and extending perpendicularly from said inside surface and said tongue having an opening therein;
  i) said inside surface of said first of said mating halves having a first pair of recesses near the front thereof for receiving the tops of said brake control knobs and a second pair of recesses near the back thereof, and smaller than said first pair of recesses, for receiving the shafts of said brake control knobs;
  ii) said second of said mating halves having a third pair of recesses near the front thereof and mating with said first pair of recesses for receiving the tops of said brake control knobs and a fourth pair of recesses near the back thereof, and smaller than said third pair and mating with said second pair of recesses, for receiving the shafts of said brake control knobs and further including a channel for receiving said tongue of said first half;
  iii) said second of said mating halves including covers near the front thereof and extending perpendicularly from said inside surface, said covers covering said first and said third pair of recesses and having peripheral edges for engaging mating slots in said first of said mating halves;
 b. a lock having a locking pin being disposed in said second mating half wherein said locking pin engages said opening in said tongue so as to secure said first and second halves together; and,
 c. adjustment screws secured into said first pair of recesses for engaging a back side of the tops of said brake control to prevent movement thereof.

2. A device as in claim 1 wherein said brake control knobs include a valve knob connected to a valve shaft and said device further includes a valve knob contact connected on the inside of one of the mating halves, said valve knob contact conformed to engage said valve knob so as to prevent removal of said valve knob from said valve shaft.

3. The device as in claim 2 wherein said valve knob contact includes a pair of vertical ridges.

4. A device as in claim 1 wherein said device is formed from plastic.

5. A device as in claim 1 wherein said device is formed from metal.

6. A device as in claim 1 wherein said device is formed from a poly-carbon fiber.

7. A device as in claim 1 further including:
  a) a lock tab in one of said mating halves; and
  b) a lock tab receiving slot in the other of said mating halves.

8. In vehicles with at least one extended mechanical valve, wherein said at least one extended mechanical valve includes a valve knob with a front and a back connected to a valve shaft, an anti-theft device comprising:
  a) a mechanical valve cover including a first half and a second half;
  b) a cover attached to said first half wherein, when said first half and said second half are placed around said extended mechanical valve, said mechanical valve cover covers at least the front of said valve knob with a solid, undivided surface; and,
  c) an adjustment mechanism conformed to adjustably engage said at least one extended mechanical valve comprising an adjustable screw conformed to adjustably engage said back of said valve knob.

9. The device of claim 8 further including a valve knob contact connected to said mechanical valve cover, said valve knob contact conformed to engage said valve knob so as to prevent rotation of said valve knob and removal of said valve knob from said valve shaft.

10. The device of claim 9 wherein said valve knob contact includes a pair of vertical ridges.

11. The device of claim 8 further including a lock connected to said mechanical valve cover for locking said first half and said second half together.

12. The device of claim 8 further including:
  a) a lock tab in one of said cover portions; and
  b) a lock tab receiving slot in the other of said cover portions.

13. In a vehicle with two extended brake valves, wherein each of said brake valves includes a valve knob with a front and a back connected to a valve shaft, an anti-theft device comprising:
  a) a brake valve cover including a first half and a second half conformed to engage each other when placed around said two extended brake valves;
  b) a cover attached to said first half wherein when said first half and said second half are placed around said extended brake valves, said brake valve cover covers the front of both of said valve knobs with a solid, undivided surface; and
  c) an adjustment mechanism comprising an adjustable screw conformed to a adjustably engage said back of said valve knob.

14. The device of claim 13 further including a valve knob contact connected to said brake valve cover, said valve knob contact conformed to engage at least one of said valve knobs so as to prevent rotation of said valve knob and removal of said valve knob from said valve shaft.

15. The device of claim 13 further comprising a lock conformed to lock said first cover portion and said second cover portion together.

* * * * *